(12) United States Patent
Fan et al.

(10) Patent No.: US 11,473,422 B2
(45) Date of Patent: Oct. 18, 2022

(54) ITERATIVE BOREHOLE CORRECTION

(71) Applicant: Halliburton Energy Services, Inc., Houston, TX (US)

(72) Inventors: Yijing Fan, Singapore (SG); Jin Ma, Houston, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 16/623,499

(22) PCT Filed: Jan. 29, 2019

(86) PCT No.: PCT/US2019/015707
§ 371 (c)(1),
(2) Date: Dec. 17, 2019

(87) PCT Pub. No.: WO2020/159484
PCT Pub. Date: Aug. 6, 2020

(65) Prior Publication Data
US 2021/0277773 A1 Sep. 9, 2021

(51) Int. Cl.
*G01V 3/18* (2006.01)
*G01V 3/38* (2006.01)
(Continued)

(52) U.S. Cl.
CPC ............ *E21B 47/12* (2013.01); *E21B 47/008* (2020.05); *E21B 47/02* (2013.01); *E21B 47/026* (2013.01);
(Continued)

(58) Field of Classification Search
CPC ........... G01V 3/38; G01V 3/18; E21B 47/026
See application file for complete search history.

(56) References Cited

U.S. PATENT DOCUMENTS

| 4,899,112 A | 2/1990 | Clark et al. |
| 7,778,778 B2 | 8/2010 | Bespalov et al. |
| (Continued) | | |

FOREIGN PATENT DOCUMENTS

| CA | 2593591 | 3/2013 |
| WO | 2016137500 | 9/2016 |
| WO | 2016153617 | 9/2016 |

OTHER PUBLICATIONS

Wu et al., Petrophysical Interpretation of a Multispacing 2-MHz MWD Resistivity Tool in Vertical and Horizontal Wells, Oct. 6-9, 1996, 1996 SPE Annual Technical Conference and Exhibition, Denver, Colorado, pp. 579-594 (Year: 1996).*

(Continued)

*Primary Examiner* — Toan M Le
(74) *Attorney, Agent, or Firm* — Kilpatrick Townsend & Stockton LLP (57) ABSTRACT

Raw signal measurements can be received by sensors in a wellbore. Borehole effects can affect the raw signal measurements. The raw signal measurements can be converted into ratio signals having attenuation and phase shift. An apparent resistivity can be determined from the ratio signals. Mud resistivity can be determined based on apparent resistivity, at least part of the raw signal measurements, and the borehole size. A true resistivity can be determined based on the mud resistivity and at least part of the ratio signals. The raw signal measurements and the ratio signals can be updated based on the true resistivity. Steps can be repeated to determine a corrected true resistivity. Based on the true resistivity value and updated raw signal measurements and ratio signals, an operating characteristic of a well tool can be caused to be adjusted.

20 Claims, 7 Drawing Sheets

(51) Int. Cl.
*E21B 47/12* (2012.01)
*G06F 16/901* (2019.01)
*E21B 47/008* (2012.01)
*E21B 47/02* (2006.01)
*E21B 47/026* (2006.01)

(52) U.S. Cl.
CPC .................. *G01V 3/18* (2013.01); *G01V 3/38* (2013.01); *G06F 16/9017* (2019.01)

(56) References Cited

U.S. PATENT DOCUMENTS

| | | | |
|---|---|---|---|
| 7,940,050 | B2 | 5/2011 | Bespalov et al. |
| 8,181,510 | B2 | 5/2012 | Aldred et al. |
| 9,223,056 | B2 | 12/2015 | Wu et al. |
| 2005/0140373 | A1* | 6/2005 | Li .............................. G01V 3/30 324/338 |
| 2009/0082969 | A1 | 3/2009 | Rabinovich et al. |
| 2009/0230968 | A1 | 9/2009 | Bittar et al. |
| 2010/0082255 | A1 | 4/2010 | Davydycheva et al. |
| 2013/0073206 | A1 | 3/2013 | Hou et al. |
| 2017/0131433 | A1 | 5/2017 | Hartmann et al. |

OTHER PUBLICATIONS

International Application No. PCT/US2019/015707, International Search Report and Written Opinion, dated Oct. 24, 2019, 9 pages.
Zhen et al., "A real-time borehole correction of electromagnetic wave resistivity logging while drilling", Elsevier BV, 2013, pp. 671-672.

* cited by examiner

ITERATIVE BOREHOLE CORRECTION

TECHNICAL FIELD

The present disclosure relates generally to systems and methods for use in a wellbore environment. More specifically, but not by way of limitation, this disclosure relates to adjusting well tool operation to adhere to iterative borehole corrections based on formation resistivity and mud resistivity.

BACKGROUND

As a borehole is drilled, logging-while-drilling ("LWD") tools can be used to measure various characteristics of a formation and contents flowing through the formation, such as formation fluid or drilling fluid. These characteristics can be measured by sensors and other devices that can be conveyed within the borehole. The characteristics, often measured as raw voltage signals, can be used throughout drilling or completion operations. Measuring and predicting the raw voltage signals accurately and in real-time can be useful to ensure the successful and efficient operation of the wellbore.

Borehole effects caused by conditions within the wellbore can impede the use of the raw voltage signals by altering the raw voltage signals. Often, the borehole effect on signals cannot be determined, and the wellbore operations proceed based on inaccurate data. Without knowing how borehole effects cause inaccuracies between a measured raw voltage signal and the actual wellbore conditions corresponding to that voltage signal, a large number of unknown factors exist that can prevent a wellbore system from operating successfully or efficiently.

DETAILED DESCRIPTION

Certain aspects and features relate to adjusting a well tool operation to adhere to borehole corrections based on formation resistivity and mud resistivity. Raw signals corresponding to characteristics in a borehole can be measured using transmitters and receivers located on a downhole tool. Ratio signals can be determined based on the dimensional components of the raw signals. Using a lookup table an apparent, or projected, resistivity value can be determined based on a ratio signal. Using another lookup table, a mud resistivity value can be determined based on the apparent resistivity value, dimensional components of the raw signals, and the size of the borehole. Using the same lookup table, a true resistivity value can be determined based on the mud resistivity value and the ratio signal used to determine the apparent resistivity value. The true resistivity value can be used to update the lookup tables with the dimensional components of the raw signals and the ratio signals for future measurements, such that borehole effects are taken into consideration for accurate determination of wellbore conditions. Based on the true resistivity value, an operating characteristic of a well tool can be adjusted to change borehole conditions to achieve an actual resistivity value close to or equivalent to the true resistivity value.

In some examples, the downhole tool can be a logging-while-drilling ("LWD") tool that can include a pair of transmitters and receivers located at different distances from the transmitters along the axis of the tool. An apparent resistivity of a formation can be derived from the attenuation and phase shift between the two receivers. But, the borehole can be filled with different types of mud that can affect measurements and the derived formation resistivity. Borehole correction is needed to correct the apparent resistivity.

A ratio signal, including attenuation and phase shift, can be used for correcting apparent resistivity. Borehole size and mud resistivity can be pre-determined from bit size and prior information. The ratio signal can be the least sensitive component to the borehole effects. Reasonable apparent resistivity can be obtained even with mud resistivity variation in downhole. But, the accuracy of borehole correction can still be affected by mud resistivity change. Moreover, the raw signal measurements can be more sensitive to the borehole effects and mud resistivity. To improve borehole correction accuracy with varying mud resistivity, and also to correct raw signals for further inversion processing, a more robust borehole correction scheme can be used.

For example, an iterative multi-step borehole correction method can be used for a collocated tilted antenna LWD resistivity tool. The collocated tilted transmitter-receiver antenna design can provide signal responses that can be analyzed to determine three-dimensional components, where borehole effects may exhibit different effects on the signal response in each dimension. Some dimensional components of the signal response may me more sensitive to borehole effects than other components of the signal response. In addition, the dimensional components of multiple signal responses can be used to determine ratio signals. Ratio signals can be less sensitive to the borehole effects compared to the dimensional components. As a result, ratio signals can be employed as initial inputs for determining a formation resistivity as close to the actual formation sensitivity in the borehole. Then, dimensional components, which can be sensitive to borehole effects, can be utilized with formation resistivity to determine real-time mud resistivity. With known mud resistivity, the formation resistivity and the dimensional components can be updated. This multi-step borehole correction method can be further enhanced by iterating the correction process multiple times. In some examples, a well tool operation can be adjusted to manipulate borehole effects based on the determined resistivity values. The adjustments made to the well tools can cause a change in the real-time borehole effects that directly impact the accuracy and values of raw signal measurements.

Some examples may not require hardware changes to existing equipment or an increase in the number of measurements taken by the LWD tool within the borehole to determine more accurate signal values, where those values take into account borehole effects. Some examples can refine resistivity logs of shallow measurements while providing corrected raw signals as prior information for deep log inversion processing, which can help improve and enable the look ahead capability for the LWD tool.

A borehole effect can be a condition within the wellbore that causes a raw signal measurement to be skewed. A borehole effect can be a distortion on the measured and recorded data of a well log resulting from conditions in the borehole. For example, mud resistivity or borehole diameter can affect the measurements recorded by sensors downhole. Borehole corrections can be made to try to account for the borehole effects on raw signal measurements. Borehole corrections can be defined as the amount by which a log measurement must be adjusted in order to remove the contribution of the borehole. Although some log measurements can pick up a minimum of signal from the borehole, some contribution from the borehole effect can remain.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
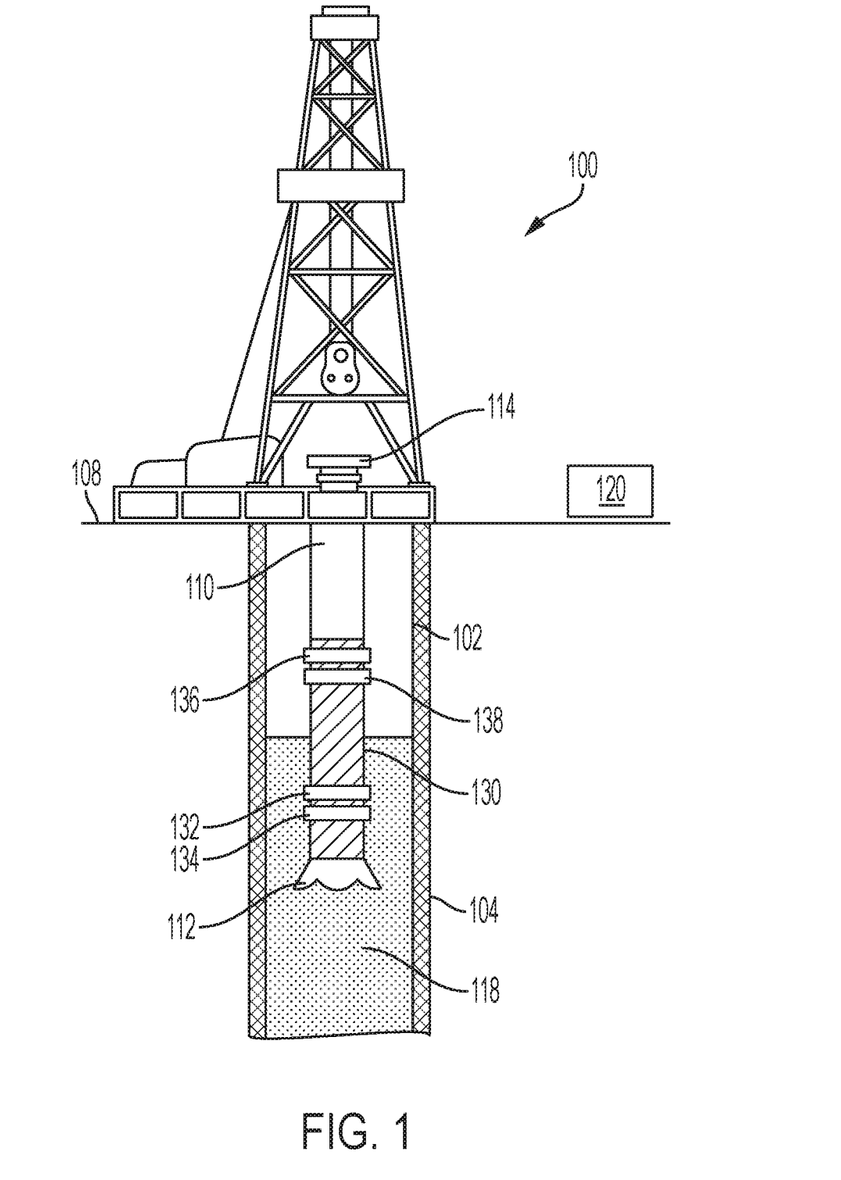
FIG. 1 is a schematic of a wellbore being drilled with an assembly that includes logging-while-drilling ("LWD") tools and a controller system for adjusting well tool operation according to some aspects of the present disclosure.

FIG. 1 is a schematic of a wellbore being drilled with an assembly that includes logging-while-drilling ("LWD") tools and a controller system for adjusting well tool operation according to one example. The well system 100 can include a wellbore 102 extending through various earth strata. The wellbore 102 extends through a hydrocarbon bearing subterranean formation 104. A very deep resistivity ("VDR") tool can include the transmitters 132, 134 and receivers 136, 138.

The well system 100 can include a drill string 110 for drilling the wellbore 102 through the subterranean formation 104. The drill string 110 can include a wellbore tool, such as the VDR tool 130, which can be driven from a derrick 114 at the surface 108 of the wellbore 102. A drill bit 112 operatively coupled to the drill string 110 may be moved axially within a drilled wellbore 102 as attached to the drill string 110. Moving the drill string 110 axially downhole or uphole can position the VDR tool 130 throughout the subterranean formation 104, where formations of the subterranean formation 104 may have different formation resistivity values.

The drill string 110 may be coupled to a motor located at the surface 108. The motor can rotate the drill string 110 at varying revolution-per-minute values to drive the drill bit 112 through the subterranean formation 104. The drill bit 112 can be used to drill through the formations having different resistivity values, where the resistivity values can affect the effective drill speed of the drill bit 112.

In some examples where drilling is not actively being performed, a wireline tool can be used to determine wellbore characteristics in the wellbore 102 and the surrounding subterranean formation 104 that are useful in determining a true resistivity value. The wireline tool can be lowered into and raised from the wellbore 102 using a reel and winch system arranged with the derrick 114. The wireline tool can include the VDR tool 130 having the transmitters 132, 134 and the receivers 136, 138 for measuring raw signals corresponding to wellbore characteristics.

The VDR tool 130 can include the transmitters 132, 134 and receivers 136, 138 to measure raw signals from within the wellbore 102. Raw signals can be voltage waveforms corresponding to parameters within the wellbore. For example, the transmitters 132, 134 can be activated, and the receivers 136, 138 can measure a response over a distance along the VDR tool 130 through a formation in the subterranean formation 104. The response measured by the receivers 136, 138 can be altered by borehole effects, such that the response distorts the receivers 136, 138 from determining real time parameters within the wellbore 102. As described in examples, the raw signals can be used to determine a true resistivity value by accounting for borehole effects.

The transmitters 132, 134 and the receivers 136, 138 can be communicatively coupled to the computing system 120 to process the raw signals. For example, the transmitters 132, 134 and the receivers 136, 138 can be in electrical communication with the computing system 120 via a wireline, such that the VDR tool 130 is conveyed into the wellbore on a wireline. As a further example, the transmitters 132, 134 and the receivers 136, 138 can include transmitters or other communication components for communicating with the computing system 120 in a wireless configuration. In another example, the VDR tool 130 can be a component of or coupled to a drill string that can be retrievable from within the wellbore. The transmitters 132, 134 and the receivers 136, 138 can include memory devices to store raw signal measurements or commands, and the computing system 120 can communicate with the transmitters 132, 134 and the receivers 136, 138 to retrieve the raw signal measurement information from the memory devices of the receivers 136, 138 at the surface 108.

The wellbore 102 can include fluid 118. The fluid 118 can flow in an annulus positioned between the wellbore drill assembly 122 and a wall of the wellbore 102. In some examples, the fluid 118 can contact the transmitters 132, 134 and the receivers 136, 138. This contact can allow the transmitters 132, 134 and the receivers 136, 138 to measure conditions within the wellbore such as mud resistivity. Additionally, the transmitters 132, 134 and the receivers 136, 138 can capture data about the wellbore environment in a LWD or measurement while drilling ("MWD") configuration. For example, the transmitters 132, 134 and the receivers 136, 138 can transmit sensed vibration signals or other sensed information to the computing system 120 to determine certain characteristics related to the mud rheology, such as flowrate and mud weight within the wellbore 102, which can be used to determine mud resistivity.

In some examples, the computing system 120 can be communicatively coupled to a control system, or can be a control system, for making adjustments to the well tool settings. Such a control system can automatically control motors, valves, pumping systems, and other well tools to affect borehole conditions that cause a borehole effect on raw signals measured by the VDR tool 130. Automatic control by such a control system can be performed in response to determining a projected true resistivity value is divergent from an actual resistivity value and/or outside of a threshold range of the projected true resistivity value. In some examples, the computing system 120 can output a message to a well operator to effectuate the desired well-tool setting adjustments for achieving a change to the actual resistivity value in the wellbore 102.

Figure 2:
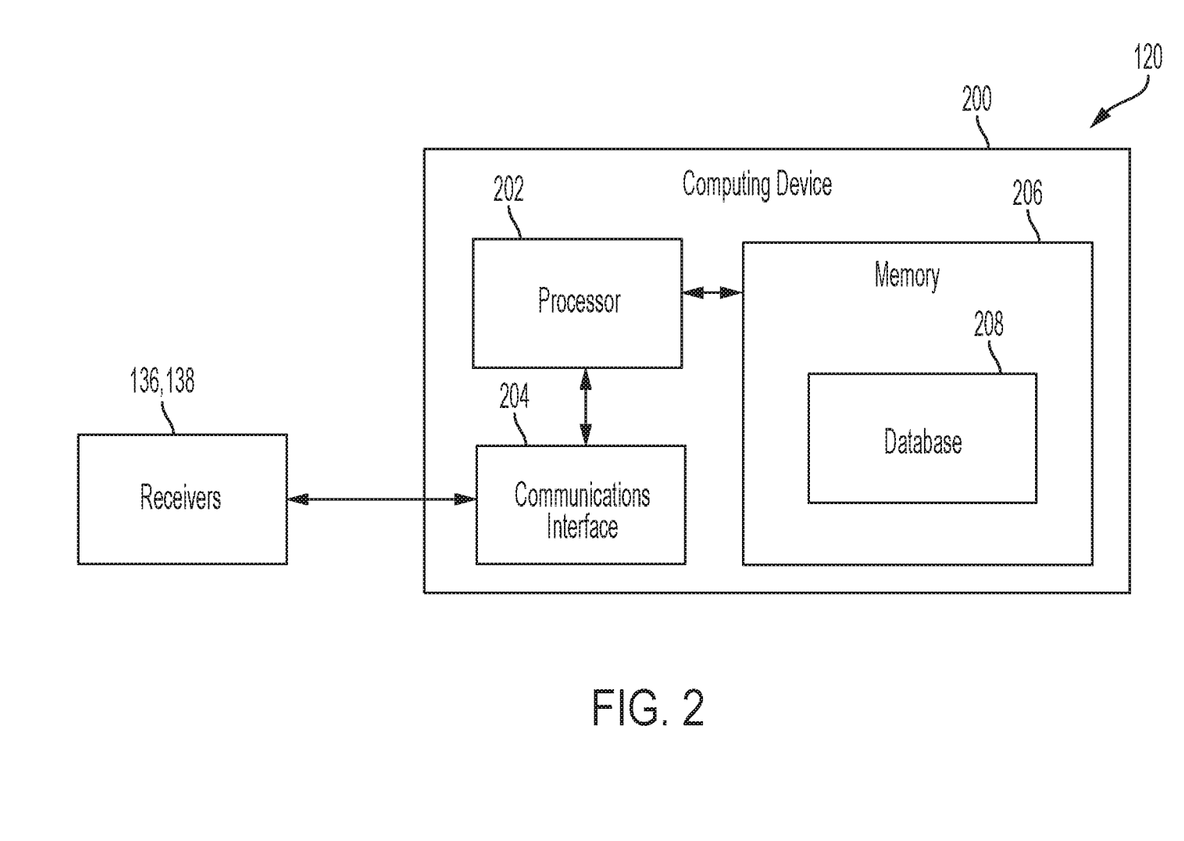
FIG. 2 is a block diagram of an example of a computing system according to some aspects of the present disclosure.

FIG. 2 is a block diagram of a computing system 120 according to some examples of the present invention. The computing system 120 can include a computing device 200 having a processor 202, a communications interface 204, and a memory 206. In some examples, the components shown in FIG. 2 (e.g., the processor 202, the communications interface 204, and the memory 206) can be integrated into a single structure. For example, the components can be within a single housing. In other examples, the components shown in FIG. 2 can be distributed (e.g., in separate housings) and in electrical communication with each other.

The receivers 136, 138 can be communicatively coupled to the computing device 200 to transmit information about the downhole wellbore conditions and/or borehole effected parameters (e.g., resistivity, raw signal measurements). The computing system 120 can be communicatively coupled to the receivers 136, 138 via the communications interface 204. The communications interface 204 can be configured to transmit the information received from the receivers 136, 138 to the memory 206 for storage and use as described in the examples. In some examples, the transmitters 132, 134 can be communicatively coupled to the communications interface 204 to transmit raw signal measurements and other borehole information to the computing device 200 for processing. In some examples, other wellbore tools such as VDR tool 130 can be communicatively coupled to the computing device 200 via the communications interface 204 to transmit and receive commands signals to operate the transmitters 132, 134, the receivers 136, 138, and other downhole devices such as sensors.

The processor 202 can execute one or more operations for implementing some examples. The processor 202 can execute instructions stored in the memory 206 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 206 via a bus. The non-volatile memory 206 may include any type of memory device that retains stored information when powered off. Non-limiting examples of the memory 206 include electrically erasable and programmable read-only memory ("EEPROM"), flash memory, or any other type of non-volatile memory. In some examples, at least some of the memory 206 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 206 can include a database 208, which can include any amount and combination of the content described in previous examples. The database 208 can lookup tables and other information used to determine one or more true resistivity values, drilling plans, and logs of true resistivity values, other LWD information, or any combination of these, among other things.

Figure 3:
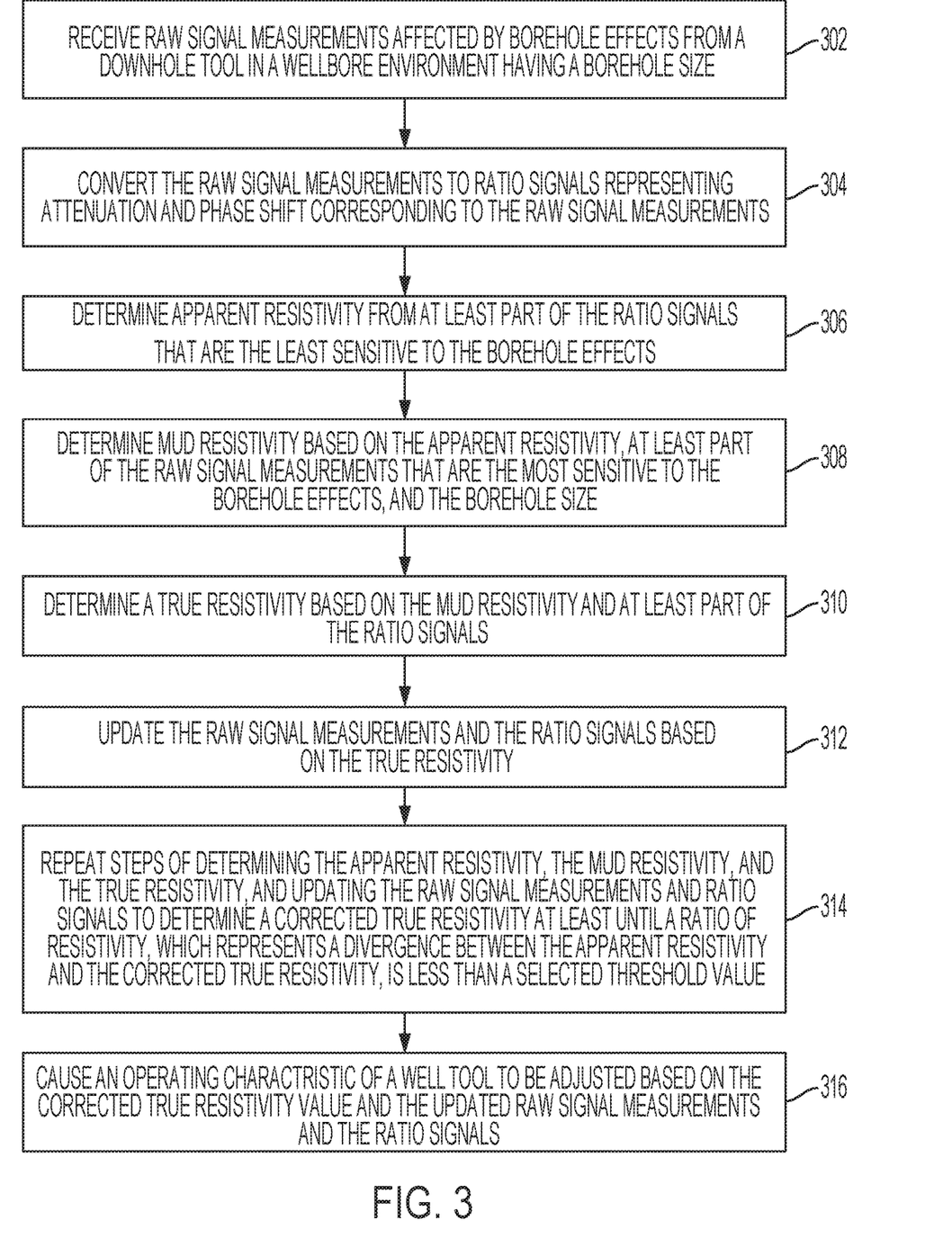
FIG. 3 is a flowchart of a process for adjusting a well tool operation to adhere to iterative borehole corrections based on formation resistivity and mud resistivity according to some aspects of the present disclosure.

FIG. 3 is a flowchart of a process for adjusting a well tool operation to adhere to iterative borehole corrections based on formation resistivity and mud resistivity according to one example. Other examples can include more steps, fewer steps, different steps, or a different order of the steps described with respect to FIG. 3. The steps of FIG. 3 are described with reference to components discussed in FIG. 1. Some or all of the steps shown in FIG. 3 can be implemented using the computing system 120 of FIG. 1.

Sensitive and insensitive components of measured raw voltage signals can be used iteratively to correct a borehole effect for LWD tools. A borehole correction process can correct multiple parameters, including formation resistivity, mud resistivity, and raw voltage measurements. The parameters can be corrected to a higher degree of accuracy by using sensitive and insensitive components of the raw voltage measurements. An operating characteristic of a well tool can then be adjusted based on the corrected parameters.

In block 302, raw signal measurements affected by borehole effects are received from a downhole tool in a wellbore environment having a borehole size. The raw signal measurements can be affected by borehole conditions, such that the measurements received are offset by borehole effects and may not represent the true downhole measurements. As mentioned above, the computing system 120 can be in communication with the transmitters 132, 134 and the receivers 136, 138 of the VDR tool 130. The transmitters 132, 134 can measure, using sensors, raw signal measurements. The transmitters 132, 134 can then transmit the raw signal measurements to the receivers 136, 138 to determine different components of the raw signal measurements. In some examples, the transmitters 132, 134 can be activated to exhibit a behavior that is detectable by the receivers 136, 138, where the detectable behavior is measurable as a voltage waveform. The raw signal measurements can include three-dimensional components corresponding to the x-axis, y-axis, and z-axis, such that different borehole effects can be exhibited along one or more axes as compared to borehole effects along the other axes.

Figure 4:
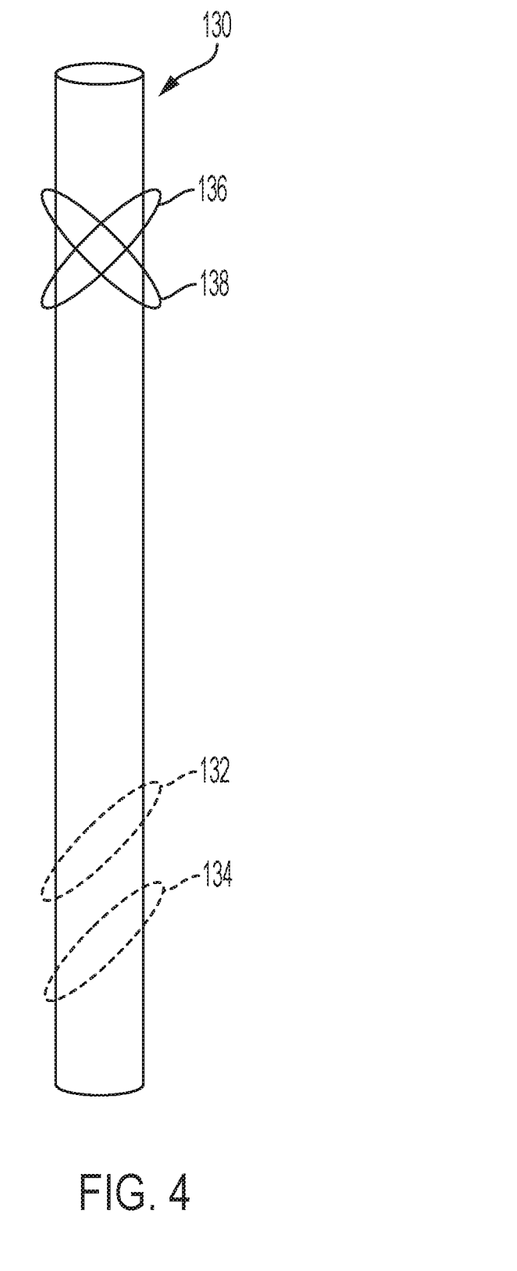
FIG. 4 depicts a very deep resistivity ("VDR") tool including transmitters and collocated receivers according to some aspects of the present disclosure.

For example, FIG. 4 depicts a VDR tool 130 including transmitters 132, 134 and collocated receivers 136, 138 according to some examples of the present disclosure. The VDR tool 130 can be a look-ahead shallow tool including sensors used to measure various downhole conditions, including raw voltage signals that can be correlated to determine mud resistivity and formation resistivity. In some examples, the transmitters 132, 134 can include or be communicatively coupled to sensors used to measure raw voltage signals, which can be correlated to determine mud resistivity and formation resistivity.

The transmitters 132, 134 can be tilted and the receivers 136, 138 can be titled with respect to the transmitters 132, 134. The opposing tilting configuration of the receivers 136, 138 can be used to measure the raw voltage signals within a three-dimensional domain. For the following example, transmitter 132 can be referred to as T1, transmitter 134 can be referred to as T2, receiver 136 can be referred to as R1, and receiver 138 can be referred to as R2. In sending the raw voltage signals measured at T1 and T2, both T1 and T2 can each transmit the raw signal measurements to R1 and R2. The resulting raw direct signals can be represented as VT1R1, VT1R2, VT2R1, VT2R2, depicting each combination of raw direct signals between the transmitters 132, 134 and the receivers 136, 138. By nature of the placement of the transmitters 132, 134 along the VDR tool 130, such that the transmitters 132, 134 are located at different depths within the wellbore, and the receivers 136, 138 being placed at different angles, the raw direct signals VT1R1, VT1R2, VT2R1, and VT2R2 can have different signal components illustrating measurable disparities in the borehole effect.

The collocated tilted transmitter-receiver antenna design can provide multiple signal responses by using receivers to measure responses from transmitters in a borehole. Each receiver can measure a response from each transmitter. For example, when using two receivers and two transmitters, four signal responses can be measured corresponding to the paired combinations of transmitters and receivers. The signal responses can be used to determine parameters, such as resistivity, useful for LWD applications. A signal response can be analyzed to determine three-dimensional components of the signal response. The signal response can be a voltage signal that is affected by borehole effects in three dimensions. The voltage signal can be analyzed to determine the borehole effects on the signal with respect to each axis. A signal response can be separated into subcomponents $V_{xx}$, $V_{xy}$, $V_{xz}$, $V_{yx}$, $V_{yy}$, $V_{yz}$, $V_{zx}$, $V_{zy}$, and $V_{zz}$. Assuming a homogenous formation, cross coupling components $V_{xy}$, $V_{xz}$, $V_{yx}$, $V_{yz}$, $V_{zx}$, $V_{zy}$ may be disregarded. The remaining response signal components $V_{xx}$, $V_{yy}$, and $V_{zz}$, can be referred to as XX, YY, and ZZ components respectively, where each component represents a portion of the original signal response in one dimension.

Because the LWD tool can have multiple transmitters and receivers, XX, YY, and ZZ components can be determined for each measured signal response. In FIG. 4, the number of signal responses that can be measured in a given moment can be four, represented as the raw direct signals VT1R1, VT1R2, VT2R1, and VT2R2. Each of the raw direct signals can have XX, YY, and ZZ components. Ratio signals, which are less influenced by borehole effects, can be calculated components across each raw direct signal.

In block 304, the raw signal measurements are converted to ratio signals representing attenuation and phase shift corresponding to the raw signal measurements. The raw direct signals VT1R1, VT1R2, VT2R1, and VT2R2 can be calculated based on the orientation of the receivers and the spacing of the transmitters. The general formula of the raw direct signals is given in equation (1), where $\theta_R$ is the tilted angle of a receiver, $\beta_R$ is the azimuth angle of the receiver, and S is physical spacing between the corresponding transmitter and receiver.

$$V(\theta_T, \beta_T, \theta_R, \beta_R) = \qquad (1)$$

$$[\sin\theta_T\cos\beta_T \;\; \sin\theta_T\sin\beta_T \;\; \cos\theta_T] \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \begin{bmatrix} \sin\theta_R\cos\beta_R \\ \sin\theta_R\sin\beta_R \\ \cos\theta_R \end{bmatrix} =$$

$$\sin\theta_T\cos\beta_T\sin\theta_R\cos\beta_R \cdot Z_{xx} + \sin\theta_T\cos\beta_T\sin\theta_R\sin\beta_R \cdot Z_{xy} +$$
$$\sin\theta_T\cos\beta_T\cos\beta_R \cdot Z_{xz} + \sin\theta_T\sin\beta_T\sin\theta_R\cos\beta_R \cdot Z_{yx} +$$

-continued
$$\sin\theta_T\sin\beta_T\sin\theta_R\sin\beta_R \cdot Z_{yy} + \sin\theta_T\sin\beta_T\cos\beta_R \cdot Z_{yz} +$$
$$\cos\theta_T\sin\theta_R\cos\beta_R \cdot Z_{zx} + \cos\theta_T\sin\theta_R\sin\beta_R \cdot Z_{zy} + \cos\theta_T\cos\theta_R \cdot Z_{zz}$$

For the example, configuration and orientation of the transmitter 132, 134 and receivers 136, 138 depicted in FIG. 4 can be $\beta_T = \beta_R = 0$, $\theta_{T1} = \theta_{T2} = \theta_{R1} = 45°$, $\theta_{R2} = -45°$. In this example, cross coupling components ($V_{xy}$, $V_{yx}$, $V_{xz}$, $V_{zx}$) can be zero in a homogeneous formation (e.g., a formation with no variation along the distance between the transmitters 132, 134 and receivers 136, 138), and can therefore be disregarded. In this example, the resulting equations 2(a), 2(b), 2(c), and 2(d) can represent the following relationships between raw signal measurements and XX and ZZ components that comprise the raw signal measurements.

$$VT1R1 = 0.5V1_{xx} + 0.5V1_{zz} \qquad (2a)$$

$$VT1R2 = -0.5V1_{xx} + 0.5V1_{zz} \qquad (2b)$$

$$VT2R1 = 0.5V2_{xx} + 0.5V2_{zz} \qquad (2c)$$

$$VT2R2 = -0.5V2_{xx} + 0.5V2_{zz} \qquad (2d)$$

Note that YY components may not be needed due to the similarities between YY components and XX components of the raw signal measurements. For example, YY components can be subjected to the same borehole effects as XX components. As such, YY components may be used as an alternative to XX components as described in examples because YY components can be as sensitive to borehole effects as XX components. The equations 2(a), 2(b), 2(c), and 2(d) can be restructured as equations 3(a), 3(b), 3(c), and 3(d) that illustrate the relationships for each XX and ZZ component of the raw signal measurements with respect to each voltage measurements from each combination of transmitter and receiver.

$$V1_{xx} = VT1R1 - VT1R2 \qquad (3a)$$

$$V1_{zz} = VT1R1 + VT1R2 \qquad (3b)$$

$$V2_{xx} = VT2R1 - VT2R2 \qquad (3c)$$

$$V2_{zz} = VT2R1 + VT2R2 \qquad (3d)$$

Figure 5:
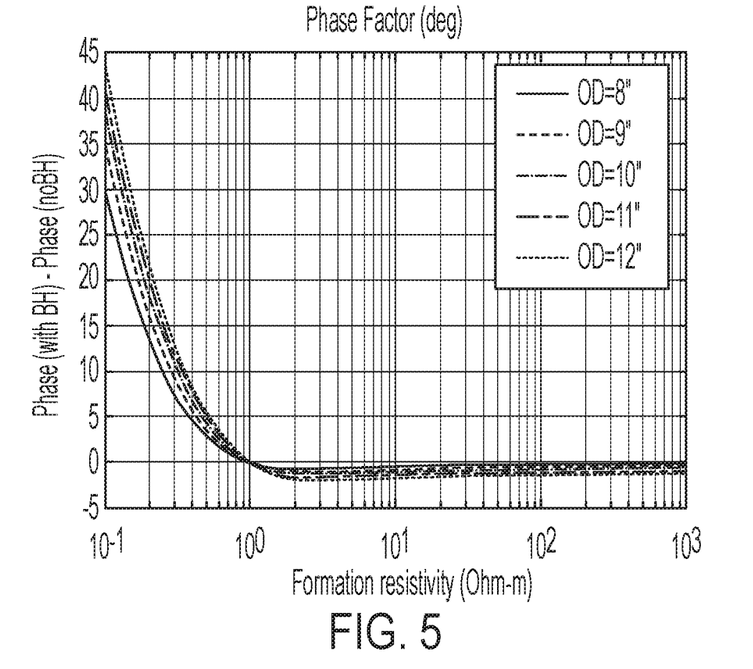
FIG. 5 depicts a graphical representation of phase factor of raw signals with respect to formation resistivity according to some aspects of the present disclosure.
Figure 6:
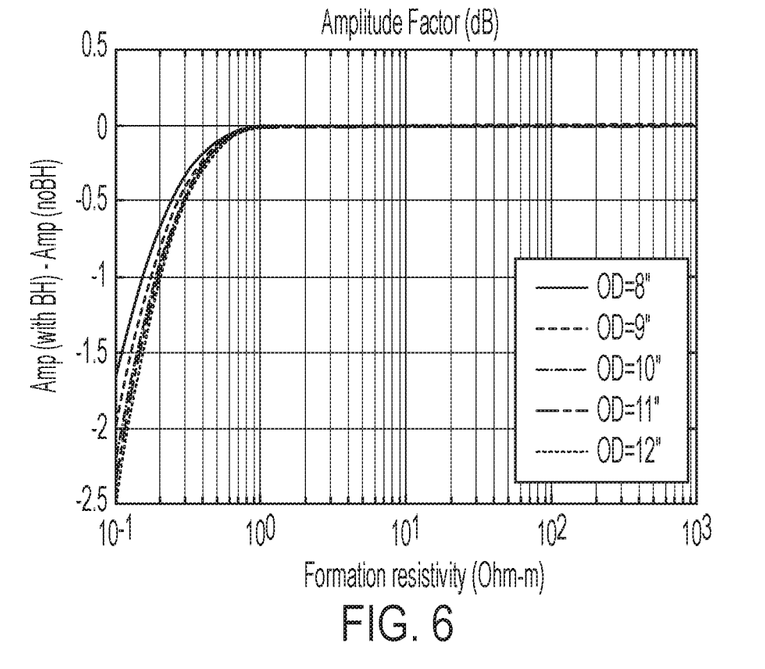
FIG. 6 depicts a graphical representation of an amplitude factor of raw signals with respect to formation resistivity according to some aspects of the present disclosure.

$V1_{xx}$, $V2_{xx}$, $V1_{zz}$, and $V2_{zz}$ are raw direct signal components that can be used in borehole correction. $V1_{xx}$, $V2_{xx}$, $V1_{zz}$, and $V2_{zz}$ have higher sensitivity to borehole effect as shown in FIGS. 5 and 6. FIG. 5 depicts a graphical representation of phase factor of raw signals with respect to formation resistivity according to one example. FIG. 6 depicts a graphical representation of an amplitude factor of raw signals with respect to formation resistivity according to one example. For the examples depicted in FIGS. 5 and 6, the data corresponds to the XX components and varies depending on borehole size, represented as "OD." The data depicted in FIGS. 5 and 6 corresponds to a wellbore having a mud resistivity of 1.0 Ohm-m, a frequency of 500 KHz, and a transmitter-to-receiver spacing of 20 inches (0.508 meters). The XX components, or $V1_{xx}$, $V2_{xx}$, can be the most sensitive directional components of the raw signal measurements with respect to borehole effect, and can therefore be used to identify and isolate borehole effects from future LWD logs, as described in further processes.

A ZZ ratio signal can be determined based on the ZZ raw signal components. In other words, the ZZ components, $V1_{zz}$, and $V2_{zz}$, can be used to determine a ZZ ratio signal having an attenuation factor and a phase shift factor. An XX ratio signal can also be calculated using the XX components, $V1_{xx}$, and $V2_{xx}$, in the same manner. Using the corresponding raw signal components to determine a ratio signal can remove borehole effects from the resulting calculation, therefore making ratio signals less sensitive to borehole effects. The attenuation ("Att") and phases ("Ps") of the respective XX ratio signals and ZZ ratio signals can be determined using the following equations.

$$Att_{xx} = -20 * \log10\left(abs\left(\frac{V2_{xx}}{V1_{xx}}\right)\right) \quad (4a)$$

$$Ps_{xx} = angle\left(\frac{V2_{xx}}{V1_{xx}}\right) * pi/180 \quad (4b)$$

$$Att_{xx} = -20 * \log10\left(abs\left(\frac{V2_{zz}}{V1_{zz}}\right)\right) \quad (4c)$$

$$Ps_{zz} = angle\left(\frac{V2_{zz}}{V1_{zz}}\right) * pi/180 \quad (4d)$$

Figure 7:
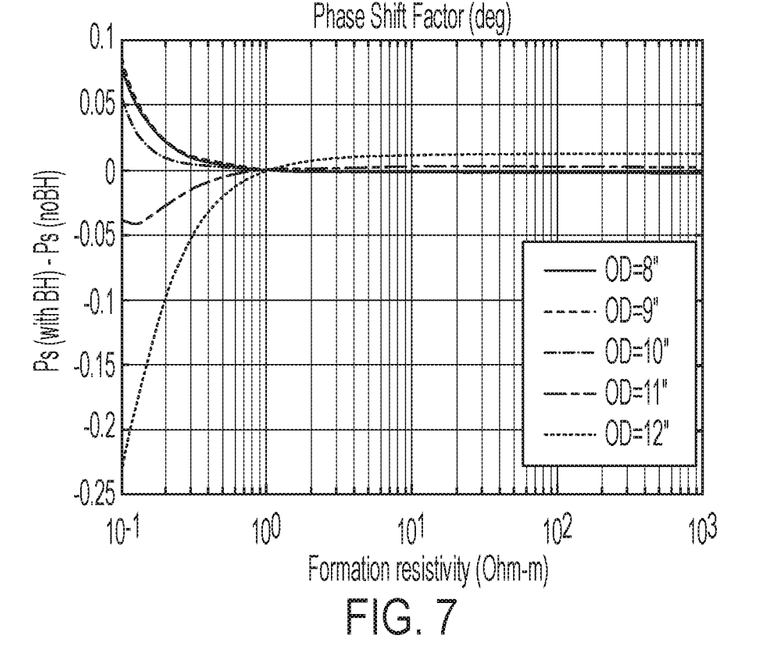
FIG. 7 depicts a graphical representation of phase shift factor of ratio signals with respect to formation resistivity according to some aspects of the present disclosure.
Figure 8:
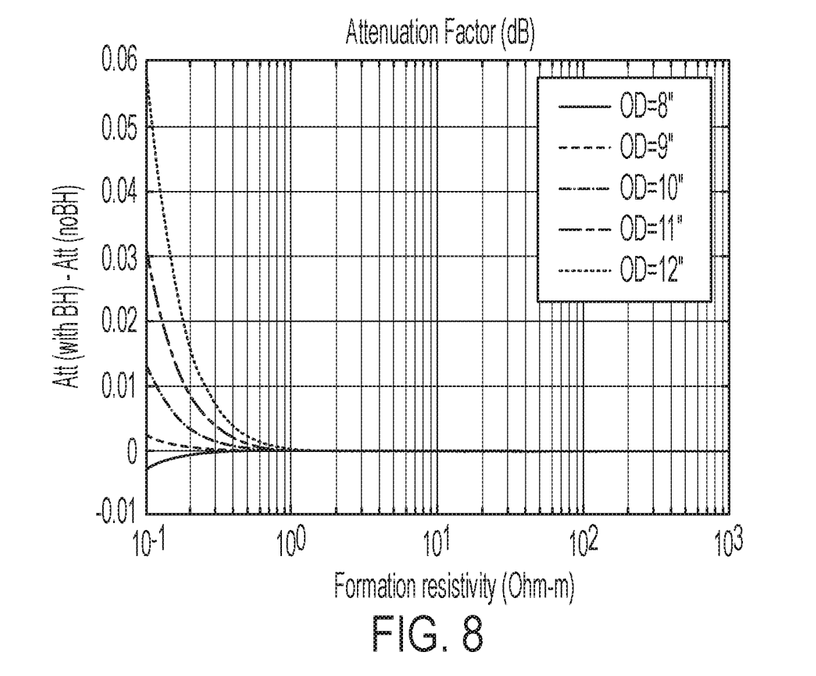
FIG. 8 depicts a graphical representation of an attenuation factor of ratio signals with respect to formation resistivity according to some aspects of the present disclosure.

The XX ratio signal represented as $Att_{xx}$, $Ps_{xx}$, and the ZZ ratio signal represented as $Att_{zz}$, $Ps_{zz}$, can exhibit less borehole effect than the XX components and ZZ components used to determine the respective ratio signals. The XX ratio signal and ZZ ratio signal can be used in borehole correction because of their lower sensitivity to borehole effect, as shown in FIGS. 7 and 8. FIG. 7 depicts a graphical representation of phase shift factor of ratio signals with respect to formation resistivity according to one example. FIG. 8 depicts a graphical representation of an attenuation factor of ratio signals with respect to formation resistivity according to one example. For the examples depicted in FIGS. 7 and 8, the data corresponds to the ratio signal calculated using ZZ components and varies depending on borehole size, represented as "OD." The data depicted in FIGS. 7 and 8 corresponds to a wellbore having a mud resistivity of 1.0 Ohm-m, a frequency of 500 KHz, and a transmitter-to-receiver spacing of 24 inches (0.6096 meters). Compared to FIGS. 5 and 6 illustrating the high sensitivity of the raw signal measurements to borehole effect, FIGS. 7 and 8 illustrate the low sensitivity of the ratio signals to borehole effect. The ZZ ratio signal, which can exhibit the least sensitivity with respect to borehole effect, can be used to identify and isolate borehole effects from future LWD logs, as described in further processes.

Figure 9:
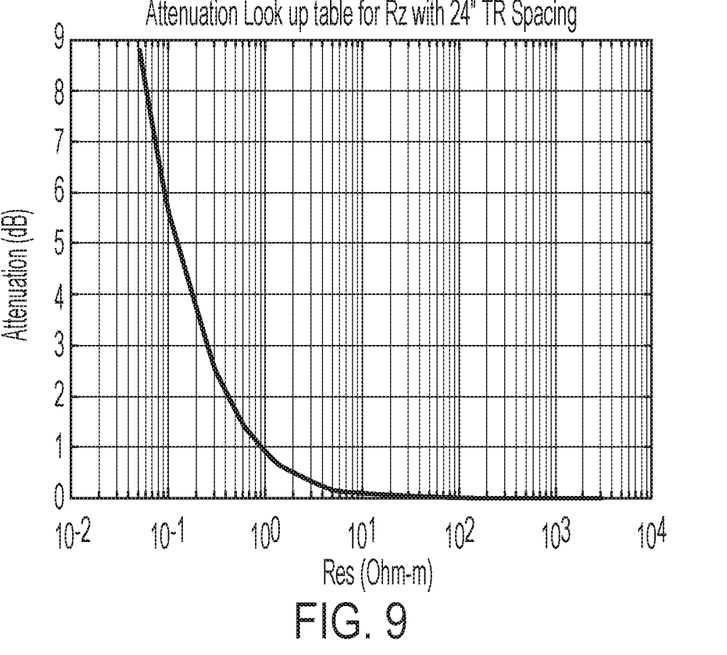
FIG. 9 depicts a graphical representation of a resistivity lookup table for determining a resistivity value close to an actual resistivity in a borehole according to some aspects of the present disclosure.

In block 306, apparent resistivity is determined from at least part of the ratio signals determined in block 304. These ratio signals can be the least sensitive to the borehole effects. An apparent resistivity can be retrieved from a lookup table based on the ratio signals. The least borehole sensitive component $Att_{zz}$ of the ZZ ratio signal can be used to determine an apparent resistivity from an apparent resistivity lookup table. The apparent resistivity lookup table can be a pre-generated mapping table between resistivity and $Att_{zz}$ in a homogeneous formation model that assumes no borehole effect as shown in FIG. 9. FIG. 9 depicts a graphical representation of resistivity lookup table for determining a resistivity value close to an actual resistivity in a borehole according to one example. Using the apparent resistivity lookup table, a closest resistivity to the true resistivity within the borehole can be determined based on the ZZ ratio signal attenuation, $Att_{zz}$.

An apparent resistivity table can originally store the same resistivity values for applications having the same transmitter-to-receiver spacing. For example, a VDR tool can have a transmitter-to-receiver spacing of 20 inches (0.508 meters), and a corresponding apparent resistivity lookup table can have apparent resistivity values retrievable using an attenuation value of each ZZ ratio signal. Another VDR tool can have a transmitter-to-receiver spacing of 24 inches (0.6096 meters), which can be associated with a different apparent resistivity lookup table from the 20 inch (0.508 meters) transmitter-to-receiver spacing. The different apparent resistivity lookup table can have different apparent resistivity values for the same attenuation values of each ZZ ratio signal.

In block 308, mud resistivity is determined based on the apparent resistivity, at least part of the raw signal measurements that can be the most sensitive to the borehole effects, and the borehole size. A mud resistivity value can be retrieved from a mud-resistivity lookup table based on the apparent resistivity value, the raw signal components such as the XX components, and the borehole size. The apparent resistivity value determined in block 306 can be used to determine a mud resistivity from a mud-resistivity lookup table. Borehole size, or drill bit size, and XX components, $V1_{xx}$ and $V2_{xx}$, can be used in conjunction with the apparent resistivity value to identify a mud resistivity value from the mud-resistivity lookup table. Particularly, the phase of the XX components can be the most sensitive to borehole effects. For the same reasons, the phase of the XX components can be sensitive to mud resistivity, making it a useful parameter in identifying the closest mud resistivity value to the actual mud resistivity value within the borehole.

Figure 10:
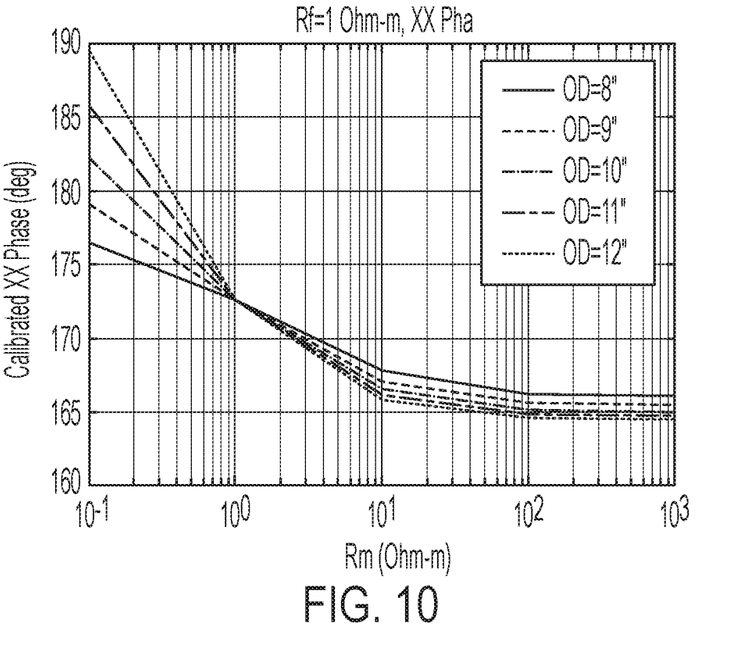
FIG. 10 depicts a graphical representation of mud-resistivity lookup table for determining a mud resistivity value close to an actual mud resistivity in a borehole according to some aspects of the present disclosure.

The mud-resistivity lookup table can be a pre-generated mapping table between mud resistivity and XX component phase in a homogeneous formation model that assumes the existence of a borehole effect as shown in FIG. 10. FIG. 10 depicts a graphical representation of mud-resistivity lookup table for determining a mud resistivity value close to an actual mud resistivity in a borehole according to one example. Specifically, borehole size, apparent resistivity, and mud resistivity can be mapped to measurement components including voltage (e.g., of raw direct signals), attenuation, and phase shift. Using the mud-resistivity lookup table, a closest resistivity to the true mud resistivity value within the borehole can be determined in real time based on the XX components, apparent resistivity, and borehole size. The mud resistivity model can be generated using forward modelling techniques based on observed values for mud resistivity and the raw signal measurements that are responsive to the mud resistivity.

A mud resistivity table can originally store the same mud resistivity values for applications having the same transmitter-to-receiver spacing. For example, a VDR tool can have a transmitter-to-receiver spacing of 20 inches (0.508 meters), and a corresponding apparent resistivity lookup table can have mud resistivity values retrievable using a borehole size, apparent resistivity, and XX component phases. Another VDR tool can have a transmitter-to-receiver spacing of 24 inches (0.6096 meters), which can be associated with a different mud-resistivity lookup table compared the 20 inch (0.508 meters) transmitter-to-receiver spacing. The different mud-resistivity lookup table can have different mud resistivity values for the same parameters used in looking up mud resistivity values in applications with different transmitter-to-receiver spacing.

In block 310, a true resistivity is determined based on the mud resistivity and at least part of the ratio signals. A true resistivity value can be retrieved from the mud-resistivity lookup table based on the mud resistivity value and the z-direction ratio signal. Using the mud resistivity value determined in block 308 and the ZZ ratio signal determined in block 304, a true resistivity value for the formation can be identified from the same mud-resistivity lookup table used in block 308. The true resistivity value can correspond to the actual formation resistivity value located within the borehole, such that the true resistivity value is a projected value as close to the actual resistivity in the borehole as possible while accounting for borehole effect.

In some examples, the true resistivity value can be stored in the computing system 120 or a database in communication with the computing system 120. The true resistivity value can be stored in association with the parameters (e.g., XX components, ZZ ratio signal, borehole size, mud resistivity, apparent resistivity) used to determine the true resistivity value as described in examples.

In block 312, the raw signal measurements and are updated based on the true resistivity. The raw signal measurements and the ratio signals can be updated within a well log for use in wellbore operations. Updating the raw signal measurements and the ratio signals can allow for taking borehole effect into account. Thus, a well log or other databases can be updated to correct raw signal measurements with boreholes effects and ratio signals with borehole effects. The updated raw signal measurements and updated ratio signals can be corrected into raw signal measurements without borehole effects and ratio signals without borehole measurements. This can allow for LWD data to be updated to more accurately represent actual measurements that exist within the borehole.

In some examples, the response signals, such as ZZ ratio signals having a phase shift and attenuation, used to determine the true resistivity value can be used to update, or correct, the apparent resistivity lookup table. Updating the apparent resistivity lookup table with ZZ ratio signals can allow for the apparent resistivity lookup table to be more refined for further iterations of determining a more accurate true resistivity. For example, the apparent resistivity lookup table can initially assume that raw signal measurements are not affected by borehole conditions, and therefore may not provide accurate determinations for actual resistivity within the borehole. After determining a true resistivity taking into account borehole effects, the apparent resistivity lookup table can be updated with the ZZ ratio signal, such that a lookup table value corresponding to the true resistivity value can be associated with the ZZ ratio signal. A previous value of the ZZ ratio signal corresponding to an apparent resistivity value can be replaced by the ZZ ratio signal corresponding to the true resistivity value that is equal to that apparent resistivity value. Essentially, a ZZ ratio signal value is updated based on the true resistivity value that takes into account borehole effect. In some examples, the XX ratio signals determined in block 304 can be updated in lookup tables in a similar manner as updating ZZ ratio signals used to determine a true resistivity value.

In some examples, the response signals, such as XX components having a phase shift, used to determine the true resistivity value can be used to update, or correct, the mud-resistivity lookup table. Updating the mud-resistivity lookup table with XX components can allow for the mud-resistivity lookup table to be more refined for further iterations of determining a true resistivity value. For example, the mud-resistivity lookup table can initially assume that raw signal measurements are not affected by borehole conditions, and therefore may not provide accurate determinations for actual resistivity within the borehole. After determining a true resistivity taking into account borehole effects, the mud-resistivity lookup table can be updated with the XX components, such that a lookup table value corresponding to the true resistivity value can be associated with the XX components. A previous value of the XX components corresponding to a mud resistivity value can be replaced by the XX components corresponding to the true resistivity value that is equal to that mud resistivity value. Essentially, a XX component phase value is updated based on the true resistivity value that takes into account borehole effect. In some examples, the ZZ components determined in block 304 can be updated in lookup tables in a similar manner as updating XX components used to determine a true resistivity value.

In block 314, steps of determining the apparent resistivity, the mud resistivity, and the true resistivity, and updating the ratio signals are repeated to determine a corrected true resistivity at least until a ratio of resistivity, which represents a divergence between the apparent resistivity and the corrected true resistivity, is less than a selected threshold value. One or more iterations of the processes described in blocks 302 through 312 can be performed to further improve the accuracy of the true resistivity value determined in block 310 as compared to the actual resistivity value in the borehole. To further improve the borehole correction accuracy determined by the true resistivity value, corrected attenuation and phase shift raw signals (e.g., ZZ ratio signals and XX components) can be used in additional processes implementing the examples described in blocks 302 through 312.

Multiple iterations of the processes described in blocks 302 through 312 can be performed until a certain threshold level is reached by a ratio of resistivity, which can be defined as the following ratio: ((apparent resistivity value−true resistivity value)/true resistivity value). The threshold can be selectable based on user input or by the computing system 120. The threshold value can be defined based on application-specific needs and synthetic testing. For example, when processing the raw signal measurements, the apparent resistivity may be significantly divergent from the true resistivity, resulting in a large ratio of resistivity that may not be within a threshold value, such that the true resistivity value and corresponding parameters (e.g., XX components, ZZ ratio signal) are not accurate enough. Additional iterations of the processes described in 302 through 312 can reduce the divergence from the apparent resistivity and the true resistivity, reducing the value of the ratio of resistivity. When the ratio of resistivity is smaller than the defined threshold, the multiple iterations of processes described in blocks 302 through 312 can cease and output the final result including further refined values for true resistivity, ZZ ratio signals, and XX components, among other parameters.

In block 316, the computing system 120 causes an operating characteristic of a well tool to be adjusted based on the corrected true resistivity value and the updated raw signal measurements and ratio signals. For example, the computing system 120 can cause a well tool setting, wellbore characteristic, or both to be adjusted in order to manipulate the drill string, drill bit, wireline tool, or other downhole device. The computing system 120 can cause these adjustments to be made by transmitting commands to one or more well tools or using other techniques. An operating characteristics of a well tool can include rate of penetration, drilling fluid flow and pressure, rate of conveyance into the borehole, a revolution-per-minute value of a rotating well tool (e.g., drill string, drill bit), As discussed above, the computing system 120 can cause these adjustments to be made based on the true resistivity value determined in block 310 and the updated raw signal measurements and ratio signals determined in block 312. The updated raw signal measurements and updated ratio signals, being the result of reducing the borehole effect on the raw signal measurements and the ratio signals, can be used to as an accurate depiction of the actual wellbore conditions to then adjust a well tool characteristic. For example, a true resistivity value and updated raw signal measurements and ratio signals may indicate that a drill plan having a predetermined drill path for a drill bit may be incorrect, such that the formation resistivity exhibited downhole is not equivalent or approximate to the true resistivity value project in block 310. The lack of equivalence between the true resistivity value and the actual resistivity value can be used to determine that a drill bit has departed too far from the drilling plan, and a rate of penetration of the drill bit can be reduced or increased to better align the drill bit with the drilling plan. This can allow the raw signal measurements from the transmitters 132, 134 and the receivers 136, 138 of the VDR tool 130 to observe real time corrections of an expected formation resistivity.

As another example, the mud resistivity value determined by the transmitters 132, 134 and the receivers 136, 138 can indicate that improper compositions of drilling fluid have been used within the mud column, such that the raw signal measurements reflect a projected mud resistivity that departs from an actual mud resistivity within the borehole. As a result of determining the disparity between the projected mud resistivity and the actual mud resistivity, a characteristic of a well tool can be adjusted to adjust the composition of the drilling fluid to affect the resistivity of the mud within the borehole.

In some aspects, systems, devices, and methods for adjusting well tool operation to adhere to iterative borehole corrections based on formation resistivity and mud resistivity are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processing device; and a non-transitory computer-readable medium including program code that is executable by the processing device for causing the processing device to: receive raw signal measurements affected by borehole effects from a downhole tool in a wellbore environment having a borehole size; convert the raw signal measurements to ratio signals representing attenuation and phase shift corresponding to the raw signal measurements; determine apparent resistivity from at least part of the ratio signals that are the least sensitive to the borehole effects; determine mud resistivity based on the apparent resistivity, at least part of the raw signal measurements that are most sensitive to the borehole effects, and the borehole size; determine a true resistivity based on the mud resistivity and the at least part of the ratio signals; update the raw signal measurements and the ratio signals based on the true resistivity; repeat steps of determining the apparent resistivity, the mud resistivity, and the true resistivity, and updating the raw signal measurements and the ratio signals to determine a corrected true resistivity at least until a ratio of resistivity, which represents a divergence between the apparent resistivity and the corrected true resistivity, is less than a selected threshold value; and cause an operating characteristic of a well tool to be adjusted based on the corrected true resistivity and the updated raw signal measurements and ratio signals.

Example 2 is the system of example 1, wherein converting the raw signal measurements to ratio signals representing attenuation and phase shift corresponding to the raw signal measurements comprises: analyzing the raw signal measurements to determine three-dimensional components of the raw signal measurements; and determining the ratio signals using the three-dimensional components, wherein one ratio signal is based on x-axis components of the three-dimensional components of the raw signal measurements and a second ratio signal is based on z-axis components of the three-dimensional components of the raw signal measurements, wherein the z-axis components are affectable by the borehole effects less than the x-axis components.

Example 3 is the system of any of examples 1-2, wherein determining the apparent resistivity includes retrieving an apparent resistivity value from a first lookup table based on the at least part of the ratio signals that are the least sensitive to the borehole effects, wherein determining the mud resistivity includes retrieving a mud resistivity value from a second lookup table based in part on the apparent resistivity value and the at least part of the raw signal measurements that are the most sensitive to the borehole effects, and wherein determining the true resistivity include retrieving a true resistivity value from the second lookup table based in part on the mud resistivity value.

Example 4 is the system of example 3, wherein the non-transitory computer-readable medium comprises program code that is executable by the processing device for causing the processing device to: update the raw signal measurements and the ratio signals from the first lookup table based on the true resistivity value.

Example 5 is the system of any of examples 1-4, wherein causing an operating characteristic of a well tool to be adjusted based on the corrected true resistivity includes adjusting a rate-of-penetration value of the well tool.

Example 6 is the system of any of examples 1-5, wherein the downhole tool includes a first transmitter, a second transmitter, a first receiver, and a second receiver, the first transmitter being locatable at a distance downhole different from the second transmitter and the first receiver is positionable at an angle different from the second receiver.

Example 7 is the system of any of examples 1-6, wherein the ratio signals are affectable by the borehole effects less than the raw signal measurements are affectable by the borehole effects.

Example 8 is a non-transitory computer-readable medium including program code that is executable by a processing device for causing the processing device to: receive raw signal measurements affected by borehole effects from a downhole tool in a wellbore environment having a borehole size; convert the raw signal measurements to ratio signals representing attenuation and phase shift corresponding to the raw signal measurements; determine apparent resistivity from at least part of the ratio signals that are the least sensitive to the borehole effects; determine mud resistivity based on the apparent resistivity, at least part of the raw signal measurements that are the most sensitive to the borehole effects, and the borehole size; determine a true resistivity based on the mud resistivity and the at least part of the ratio signals; update the raw signal measurements and the ratio signals based on the true resistivity; repeat steps of determining the apparent resistivity, the mud resistivity, and the true resistivity, and updating the raw signal measurements and the ratio signals to determine a corrected true resistivity at least until a ratio of resistivity, which represents a divergence between the apparent resistivity and the corrected true resistivity, is less than a selected threshold value; and cause an operating characteristic of a well tool to be adjusted based on the corrected true resistivity and the updated raw signal measurements and ratio signals.

Example 9 is the non-transitory computer-readable medium of examples 8, wherein converting the raw signal measurements to ratio signals representing attenuation and phase shift corresponding to the raw signal measurements comprises: analyzing the raw signal measurements to determine three-dimensional components of the raw signal measurements; and determining the ratio signals using the three-dimensional components, wherein one ratio signal is based on x-axis components of the three-dimensional components of the raw signal measurements and a second ratio signal is based on z-axis components of the three-dimensional components of the raw signal measurements, wherein the z-axis components are affectable by the borehole effects less than the x-axis components.

Example 10 is the non-transitory computer-readable medium of any of examples 8-9, wherein determining the apparent resistivity includes retrieving an apparent resistivity value from a first lookup table based on the at least part of the ratio signals that are the least sensitive to the borehole effects, wherein determining the mud resistivity includes retrieving a mud resistivity value from a second lookup table based in part on the apparent resistivity value and the at least part on the raw signal measurements that are the most sensitive to the borehole effects, and wherein determining the true resistivity include retrieving a true resistivity value from the second lookup table based in part on the mud resistivity value.

Example 11 is the non-transitory computer-readable medium of examples 10, wherein the non-transitory computer-readable medium further comprises program code that is executable by the processing device for causing the processing device to: update the raw signal measurements and the ratio signals from the first lookup table based on the true resistivity value.

Example 12 is the non-transitory computer-readable medium of any of examples 8-11, wherein causing an operating characteristic of a well tool to be adjusted based on the corrected true resistivity includes adjusting a rate-of-penetration value of the well tool.

Example 13 is the non-transitory computer-readable medium of any of examples 8-12, wherein the downhole tool includes a first transmitter, a second transmitter, a first receiver, and a second receiver, the first transmitter being locatable at a distance downhole different from the second transmitter and the first receiver is positionable at an angle different from the second receiver.

Example 14 is the non-transitory computer-readable medium of any of examples 8-13, wherein the ratio signals are affectable by the borehole effects less than the raw signal measurements are affectable by the borehole effects.

Example 15 is a computer-implemented method comprising: receiving raw signal measurements affected by borehole effects from a downhole tool in a wellbore environment having a borehole size; converting the raw signal measurements to ratio signals representing attenuation and phase shift corresponding to the raw signal measurements; determining apparent resistivity from at least part of the ratio signals that are the least sensitive to the borehole effects; determining mud resistivity based on the apparent resistivity, at least part of the raw signal measurements that are the most sensitive to the borehole effects, and the borehole size; determining a true resistivity based on the mud resistivity and the at least part of the ratio signals; updating the raw signal measurements and the ratio signals based on the true resistivity; repeating steps of determining the apparent resistivity, the mud resistivity, and the true resistivity, and updating the raw signal measurements and the ratio signals to determine a corrected true resistivity at least until a ratio of resistivity, which represents a divergence between the apparent resistivity and the corrected true resistivity, is less than a selected threshold value; and causing an operating characteristic of a well tool to be adjusted based on the corrected true resistivity and the updated raw signal measurements and ratio signals.

Example 16 is the computer-implemented method of examples 15, wherein converting the raw signal measurements to ratio signals representing attenuation and phase shift corresponding to the raw signal measurements comprises: analyzing the raw signal measurements to determine three-dimensional components of the raw signal measurements; and determining the ratio signals using the three-dimensional components, wherein one ratio signal is based on x-axis components of the three-dimensional components of the raw signal measurements and a second ratio signal is based on z-axis components of the three-dimensional components of the raw signal measurements, wherein the z-axis components are affectable by the borehole effects less than the x-axis components.

Example 17 is the computer-implemented method of any of examples 15-16, wherein determining the apparent resistivity includes retrieving an apparent resistivity value from a first lookup table based on the at least part of the ratio signals that are the least sensitive to the borehole effects, wherein determining the mud resistivity includes retrieving a mud resistivity value from a second lookup table based in part on the apparent resistivity value and the at least part of the raw signal measurements that are the most sensitive to the borehole effects, and wherein determining the true resistivity include retrieving a true resistivity value from the second lookup table based in part on the mud resistivity value.

Example 18 is the computer-implemented method of examples 17, further comprising: updating the raw signal measurements and the ratio signals from the first lookup table based on the true resistivity value.

Example 19 is the computer-implemented method of any of examples 15-18, wherein causing an operating characteristic of a well tool to be adjusted based on the corrected true resistivity includes adjusting a rate-of-penetration value of the well tool.

Example 20 is the computer-implemented method of any of examples 15-19, wherein the ratio signals are affected by the borehole effects less than the raw signal measurements are affected by the borehole effects.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
   a processing device; and
   a non-transitory computer-readable medium including program code that is executable by the processing device for causing the processing device to:
      receive raw signal measurements affected by borehole effects from a downhole tool in a wellbore environment having a borehole size;
      convert the raw signal measurements to ratio signals representing attenuation and phase shift corresponding to the raw signal measurements;

determine apparent resistivity from a vertical component of the ratio signals with respect to the wellbore environment, the vertical component being parallel to an axis of the wellbore environment, and the vertical component being the least sensitive compared to other portions of the ratio signals with respect to the borehole effects;

determine mud resistivity based on the apparent resistivity, a horizontal component of the raw signal measurements with respect to the wellbore environment, and the borehole size, the horizontal component of the raw signal measurements being perpendicular to the axis of the wellbore environment, and the horizontal component of the raw signal measurements being the most sensitive compared to other portions of the raw signal measurements with respect to the borehole effects;

determine a true resistivity based on the mud resistivity and at least part of the ratio signals;

update the raw signal measurements and the ratio signals based on the true resistivity;

repeat steps of determining the apparent resistivity, the mud resistivity, and the true resistivity, and updating the raw signal measurements and the ratio signals to determine a corrected true resistivity at least until a ratio of resistivity, which represents a divergence between the apparent resistivity and the corrected true resistivity, is less than a selected threshold value; and cause an operating characteristic of a well tool to be adjusted based on the corrected true resistivity and the updated raw signal measurements and the ratio signals.

2. The system of claim 1, wherein converting the raw signal measurements to ratio signals representing attenuation and phase shift corresponding to the raw signal measurements comprises:

analyzing the raw signal measurements to determine three-dimensional components of the raw signal measurements; and determining the ratio signals using the three-dimensional components, wherein one ratio signal is based on x-axis components of the three-dimensional components of the raw signal measurements and a second ratio signal is based on z-axis components of the three-dimensional components of the raw signal measurements, wherein the z-axis components are affectable by the borehole effects less than the x-axis components.

3. The system of claim 1, wherein determining the apparent resistivity includes retrieving an apparent resistivity value from a first lookup table based on the vertical component of the ratio signals that are the least sensitive to the borehole effects, wherein determining the mud resistivity includes retrieving a mud resistivity value from a second lookup table based in part on the apparent resistivity value and the horizontal component of the raw signal measurements that are the most sensitive to the borehole effects, and wherein determining the true resistivity include retrieving a true resistivity value from the second lookup table based in part on the mud resistivity value.

4. The system of claim 3, wherein the non-transitory computer-readable medium comprises program code that is executable by the processing device for causing the processing device to:

update the raw signal measurements and the ratio signals from the first lookup table based on the true resistivity value.

5. The system of claim 1, wherein causing an operating characteristic of a well tool to be adjusted based on the corrected true resistivity includes adjusting a rate-of-penetration value of the well tool.

6. The system of claim 1, wherein the downhole tool includes a first transmitter, a second transmitter, a first receiver, and a second receiver, the first transmitter being locatable at a distance downhole different from the second transmitter and the first receiver is positionable at an angle different from the second receiver.

7. The system of claim 1, wherein the ratio signals are affectable by the borehole effects less than the raw signal measurements are affectable by the borehole effects.

8. A non-transitory computer-readable medium including program code that is executable by a processing device for causing the processing device to:

receive raw signal measurements affected by borehole effects from a downhole tool in a wellbore environment having a borehole size;

convert the raw signal measurements to ratio signals representing attenuation and phase shift corresponding to the raw signal measurements;

determine apparent resistivity from a vertical component of the ratio signals with respect to the wellbore environment, the vertical component being parallel to an axis of the wellbore environment, and the vertical component being the least sensitive compared to other portions of the ratio signals with respect to the borehole effects;

determine mud resistivity based on the apparent resistivity, a horizontal component of the raw signal measurements with respect to the wellbore environment, and the borehole size, the horizontal component of the raw signal measurements being perpendicular to the axis of the wellbore environment, and the horizontal component of the raw signal measurements being the most sensitive compared to other portions of the raw signal measurements with respect to the borehole effects;

determine a true resistivity based on the mud resistivity and at least part of the ratio signals;

update the raw signal measurements and the ratio signals based on the true resistivity;

repeat steps of determining the apparent resistivity, the mud resistivity, and the true resistivity, and updating the raw signal measurements and the ratio signals to determine a corrected true resistivity at least until a ratio of resistivity, which represents a divergence between the apparent resistivity and the corrected true resistivity, is less than a selected threshold value; and cause an operating characteristic of a well tool to be adjusted based on the corrected true resistivity and the updated raw signal measurements and the ratio signals.

9. The non-transitory computer-readable medium of claim 8, wherein converting the raw signal measurements to ratio signals representing attenuation and phase shift corresponding to the raw signal measurements comprises:

analyzing the raw signal measurements to determine three-dimensional components of the raw signal measurements; and determining the ratio signals using the three-dimensional components, wherein one ratio signal is based on x-axis components of the three-dimensional components of the raw signal measurements and a second ratio signal is based on z-axis components of the three-dimensional components of the raw signal measurements, wherein the z-axis components are affectable by the borehole effects less than the x-axis components.

10. The non-transitory computer-readable medium of claim 8, wherein determining the apparent resistivity includes retrieving an apparent resistivity value from a first lookup table based on the vertical component of the ratio signals that are the least sensitive to the borehole effects, wherein determining the mud resistivity includes retrieving a mud resistivity value from a second lookup table based in part on the apparent resistivity value and the horizontal component of the raw signal measurements that are the most sensitive to the borehole effects, and wherein determining the true resistivity include retrieving a true resistivity value from the second lookup table based in part on the mud resistivity value.

11. The non-transitory computer-readable medium of claim 10, wherein the non-transitory computer-readable medium further comprises program code that is executable by the processing device for causing the processing device to:
update the raw signal measurements and the ratio signals from the first lookup table based on the true resistivity value.

12. The non-transitory computer-readable medium of claim 8, wherein causing an operating characteristic of a well tool to be adjusted based on the corrected true resistivity includes adjusting a rate-of-penetration value of the well tool.

13. The non-transitory computer-readable medium of claim 8, wherein the downhole tool includes a first transmitter, a second transmitter, a first receiver, and a second receiver, the first transmitter being locatable at a distance downhole different from the second transmitter and the first receiver is positionable at an angle different from the second receiver.

14. The non-transitory computer-readable medium of claim 8, wherein the ratio signals are affectable by the borehole effects less than the raw signal measurements are affectable by the borehole effects.

15. A computer-implemented method comprising:
receiving raw signal measurements affected by borehole effects from a downhole tool in a wellbore environment having a borehole size;
converting the raw signal measurements to ratio signals representing attenuation and phase shift corresponding to the raw signal measurements;
determining apparent resistivity from a vertical component of the ratio signals with respect to the wellbore environment, the vertical component being parallel to an axis of the wellbore environment, and the vertical component being the least sensitive compared to other portions of the ratio signals with respect to the borehole effects;
determining mud resistivity based on the apparent resistivity, a horizontal component of the raw signal measurements with respect to the wellbore environment, and the borehole size, the horizontal component of the raw signal measurements being perpendicular to the axis of the wellbore environment, and the horizontal component of the raw signal measurements being the most sensitive compared to other portions of the raw signal measurements with respect to the borehole effects;
determining a true resistivity based on the mud resistivity and at least part of the ratio signals;
updating the raw signal measurements and the ratio signals based on the true resistivity;
repeating steps of determining the apparent resistivity, the mud resistivity, and the true resistivity, and updating the raw signal measurements and the ratio signals to determine a corrected true resistivity at least until a ratio of resistivity, which represents a divergence between the apparent resistivity and the corrected true resistivity, is less than a selected threshold value; and
causing an operating characteristic of a well tool to be adjusted based on the corrected true resistivity and the updated raw signal measurements and the ratio signals.

16. The computer-implemented method of claim 15, wherein converting the raw signal measurements to ratio signals representing attenuation and phase shift corresponding to the raw signal measurements comprises:
analyzing the raw signal measurements to determine three-dimensional components of the raw signal measurements; and
determining the ratio signals using the three-dimensional components, wherein one ratio signal is based on x-axis components of the three-dimensional components of the raw signal measurements and a second ratio signal is based on z-axis components of the three-dimensional components of the raw signal measurements, wherein the z-axis components are affectable by the borehole effects less than the x-axis components.

17. The computer-implemented method of claim 15, wherein determining the apparent resistivity includes retrieving an apparent resistivity value from a first lookup table based on the vertical component of the ratio signals that are the least sensitive to the borehole effects, wherein determining the mud resistivity includes retrieving a mud resistivity value from a second lookup table based in part on the apparent resistivity value and the horizontal component of the raw signal measurements that are the most sensitive to the borehole effects, and wherein determining the true resistivity include retrieving a true resistivity value from the second lookup table based in part on the mud resistivity value.

18. The computer-implemented method of claim 17, further comprising:
updating the raw signal measurements and the ratio signals from the first lookup table based on the true resistivity value.

19. The computer-implemented method of claim 15, wherein causing an operating characteristic of a well tool to be adjusted based on the corrected true resistivity includes adjusting a rate-of-penetration value of the well tool.

20. The computer-implemented method of claim 15, wherein the ratio signals are affected by the borehole effects less than the raw signal measurements are affected by the borehole effects.

* * * * *